United States Patent
Watase

(10) Patent No.: US 7,489,314 B2
(45) Date of Patent: Feb. 10, 2009

(54) DRAWING DEVICE, DRAWING METHOD, AND STORAGE MEDIUM

(75) Inventor: Shinichiro Watase, Tokyo (JP)

(73) Assignee: Kyocera Mita Corporation, Osaka (JP)

( * ) Notice: Subject to any disclaimer, the term of this patent is extended or adjusted under 35 U.S.C. 154(b) by 70 days.

(21) Appl. No.: 11/292,073

(22) Filed: Dec. 2, 2005

(65) Prior Publication Data

US 2007/0126738 A1 Jun. 7, 2007

(51) Int. Cl.
 *G06T 11/20* (2006.01)
 *G06K 9/42* (2006.01)
 *G06K 9/44* (2006.01)

(52) U.S. Cl. ........................... 345/443; 382/258

(58) Field of Classification Search ................. 382/258; 345/443
See application file for complete search history.

(56) References Cited

U.S. PATENT DOCUMENTS 5,539,534 A * 7/1996 Hino et al. .................. 358/452
6,215,504 B1 * 4/2001 Longhenry et al. .......... 345/443
6,259,821 B1 * 7/2001 Branciforte et al. ......... 382/258
6,532,030 B2 * 3/2003 Okano et al. ................ 347/131

FOREIGN PATENT DOCUMENTS

| JP | 07-110867 | 4/1995 |
| JP | 2001-016443 | 1/2001 |

* cited by examiner

*Primary Examiner*—M Good Johnson
(74) *Attorney, Agent, or Firm*—Squire, Sanders & Dempsey L.L.P.

(57) ABSTRACT

A drawing device which outputs an image datum based on a drawing mode and a command to draw, includes a coordinate conversion unit which converts coordinates in the command to draw in accordance with a designated reduction ratio and a compensation unit which adds a width to a line to be drawn when a width of the line is lost by a conversion executed by the coordinate conversion unit.

6 Claims, 5 Drawing Sheets

| PATTERN | IMAGE FOR ASSIGNING DRAWING AREA | PRIMARY STATE OF DRAWING AREA | DRAWING RESULT |
|---|---|---|---|
| 0 | 0 | 0 | 0 |
| 0 | 0 | 1 | 1 |
| 0 | 1 | 0 | 0 |
| 0 | 1 | 1 | 0 |
| 1 | 0 | 0 | 0 |
| 1 | 0 | 1 | 1 |
| 1 | 1 | 0 | 1 |
| 1 | 1 | 1 | 1 |

FIG. 9A   FIG. 9B   FIG. 9C
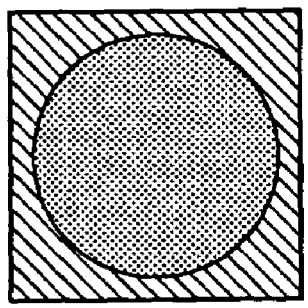 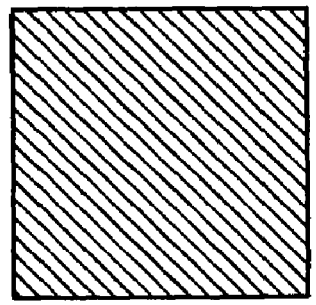 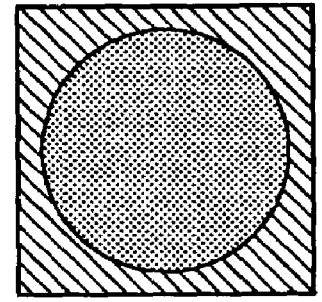
FIG. 10
| PATTERN | PRIMARY STATE OF DRAWING AREA | DRAWING RESULT |
|---|---|---|
| 0 | 0 | 0 |
| 0 | 1 | 1 |
| 1 | 0 | 1 |
| 1 | 1 | 1 |

FIG. 11A    FIG. 11B    FIG. 11C
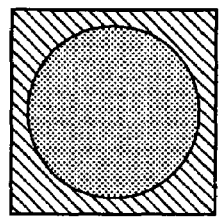 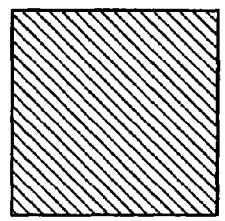 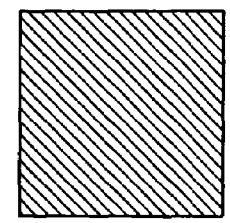
FIG. 12
| PATTERN | PRIMARY STATE OF DRAWING AREA | DRAWING RESULT |
|---|---|---|
| 0 | 0 | 0 |
| 0 | 1 | 1 |
| 1 | 0 | 1 |
| 1 | 1 | 0 |
FIG. 13A    FIG. 13B    FIG. 13C    FIG. 13D
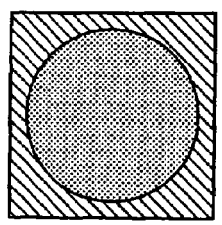 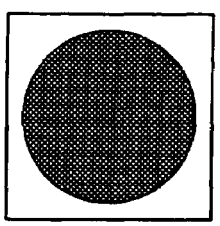 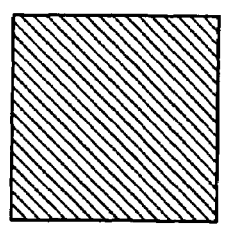 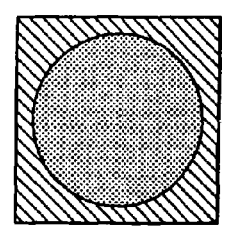

DRAWING DEVICE, DRAWING METHOD, AND STORAGE MEDIUM

BACKGROUND OF THE INVENTION

1. Field of the Invention

The present invention relates to a drawing device, drawing method, and a storage medium, which properly execute a scaling down process of an image datum.

2. Description of Related Art

When outputting high-resolution image data at low resolution, a scaling down process is needed to adjust the image data to the low resolution. As an art for this process, Japanese Unexamined Patent Application, First Publication No. H07-110867 discloses a drawing device which saves a pattern of ruled lines and adjustment information for scaling for every kind of ruled lines, and outputs adjusted image data based on the saved information. In addition, Japanese Unexamined Patent Application, First Publication No. 2001-16443 discloses a device which determines data to be drawn as a character, line, and bitmap and outputs the data, converting each coordinate in accordance with an ordered scale.

The art disclosed in Japanese Unexamined Patent Application, First Publication No. H07-110867 can only be applied to preset kinds of ruled line. In the art disclosed in Japanese Unexamined Patent Application, First Publication No. 2001-16443, a portion of the data is omitted when scaling down. Detailed information concerning the data may be lost in the process, and this leads to a phenomenon whereby a drawn data lacks some ruled lines. An explanation of this phenomenon is described hereinafter.

FIG. 3 shows a part of an output result by a drawing device such as a printer and a display. An area drawn by the drawing device has a coordinate system consisting of "x" and "y". An upper left point is set as an origin whose coordinate is x=0, y=0. Coordinate "x" increases rightward, and coordinate "y" increases downward. A minimum area specified by "x" and "y" corresponds to a point used by printers, or a pixel used by displays. FIG. 3 shows a part of an output result by the drawing device whose coordinate is $1 \leq x \leq 10$, $98 \leq y \leq 102$. Numbers on the left show coordinate "y". A shaded area indicates that area being blacked out.

When a command to black out an area of $100 \leq y < 101$ is expressed as (B=100, T=101), an output result of the command is as FIG. 3 shows. When scaling down the image to 40% to output to a low-resolution drawing device, the coordinates in the command are reduced to 40%. As a result, the command is converted to (B=40, T=40.4), and then rounded to a whole number, (B=40, T=40). Since no number meets an expression $40 \leq y < 40$, no areas are blacked out, and rule lines are not drawn as shown in FIG. 4.

SUMMARY OF THE INVENTION

The present invention provides a drawing device which outputs an image datum based on a drawing mode and a command to draw, including: a coordinate conversion unit which converts coordinates in the command to draw in accordance with a designated reduction ratio; and a compensation unit which adds a width to a line to be drawn when a width of the line is lost by a conversion executed by the coordinate conversion unit.

The drawing device of the present invention may further include a determination unit which makes a process to be performed by the compensation unit valid or invalid, depending on the drawing mode and the command to draw.

The determination unit may make the process invalid when an already-output image datum affects an image datum generated by the command to draw, and make the process valid in other cases.

The determination unit may make the process valid or invalid, depending on a determination expression when the command to draw is a ternary raster operation.

The drawing device of the present invention may further include a saving unit which saves a result of examination on each ternary raster operation to determine whether or not an event has occurred whereby nothing is drawn when the ternary raster operation is executed twice in the same area of the image datum, the determination unit making the process valid or invalid depending on the result of examination when the command to draw is a ternary raster operation.

The determination unit may make the process valid or invalid depending on a value of an alpha channel when the command to draw is an alpha blending.

In addition, the present invention provides a storage medium having a computer program stored therein for outputting an image datum, the computer program including the steps of: inputting a drawing mode and a command to draw; converting coordinates in the command to draw in accordance with a designated reduction ratio; and compensating an output of the image datum by adding a width to a line to be drawn when a width of the line is lost by a conversion of the coordinates.

The computer program may further include a step of: making the step of compensating valid or invalid, depending on the drawing mode and the command to draw.

In the step of making the step of compensating valid or invalid, the step of compensating may be made invalid when an already-output image datum affects an image datum generated by the command to draw, and may be made valid in other cases.

In the step of making the step of compensating valid or invalid, the step of compensating may be made invalid or invalid depending on a determination expression when the command to draw is a ternary raster operation.

In the step of making the step of compensating valid or invalid, the step of compensating may be made invalid or invalid in a case in which the command to draw is the ternary raster operation, depending on a result of examination on each ternary raster operation to determine whether or not an event has occurred whereby nothing is drawn when the command to draw is executed twice in the same area of the image datum.

In the step of making the step of compensating valid or invalid, the step of compensating may be made invalid or invalid, depending on a value of an alpha channel when the command to draw is an alpha blending.

Furthermore, the present invention provides a method of outputting an image datum using a computer, including: a first step of inputting a drawing mode and a command to draw; a second step of converting coordinates in the command to draw in accordance with a designated reduction ratio; and a third step of compensating an output of the image by adding a width to a line to be drawn when a width of the line is lost by a conversion of the coordinates.

The method of outputting an image datum of the present invention may further include a fourth step of making the third step valid or invalid, depending on the drawing mode and the command to draw.

The third step may be made invalid in the fourth step when an already-output image datum affects an image datum generated by the command to draw, and may be made valid in other cases.

The third step may be made valid or invalid in the fourth step, depending on a determination expression when the command to draw is a ternary raster operation.

The third step may be made valid or invalid in the fourth step in a case in which the command to draw is the ternary raster operation, depending on a result of examination on each ternary raster operation to determine whether or not an event has occurred whereby nothing is drawn when the command to draw is executed twice in the same area of the image datum.

The third step may be made valid or invalid in the fourth step depending on a value of an alpha channel when the drawing mode is an alpha blending.

BRIEF DESCRIPTION OF THE DRAWINGS

FIGS. 9A to 9C are drawings showing an example of a result of drawing by an OR method.

FIG. 10 is a chart showing operation rules in drawing by the OR method.

FIGS. 11A to 11C are drawings showing an irregular result of drawing by the OR method.

FIG. 12 is a chart showing operation rules in drawing by an XOR method.

FIGS. 13A to 13D are drawings showing an example of a result of drawing by the XOR method.

DETAILED DESCRIPTION OF THE INVENTION

An embodiment of the present invention is described hereinbelow. An example of a drawing device according to this embodiment is a personal computer which has a Central Processing Unit (CPU), a Read Only Memory (ROM), a Random Access Memory (RAM), a Hard Disk Drive (HDD), and an interface portion. The CPU controls each portion based on a control program stored in the ROM. The CPU also executes a command of a program read in the RAM from the HDD. The ROM stores the control program which the CPU executes and preset numeral data. The RAM has a memory area for storing data which the CPU uses in its processing or a program which the CPU executes temporally. The RAM also has a frame buffer 3 (shown in FIG. 2) for storing image data (image memory).

Figure 2:
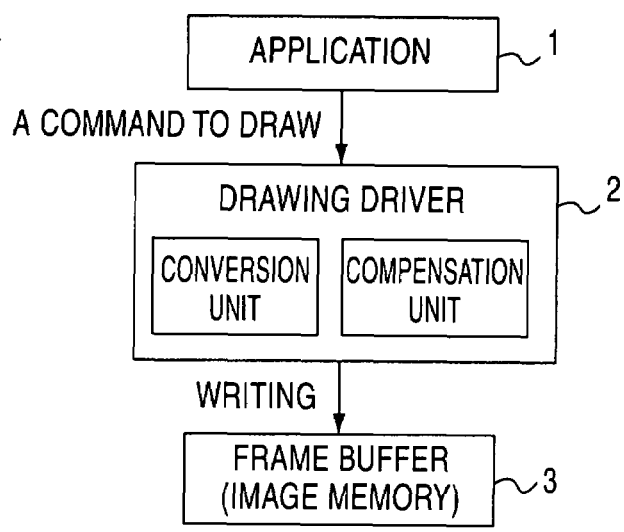
FIG. 2 is a diagram showing a flow of a command to draw, and an image datum in the drawing device.
Figure 3:
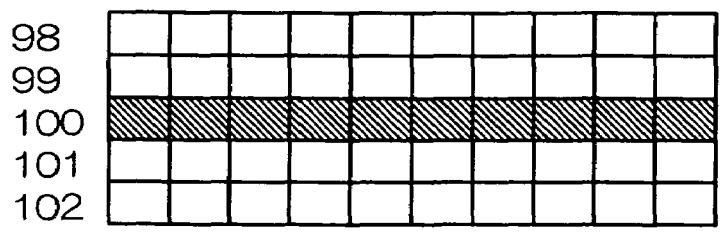
FIG. 3 is a drawing showing a result of executing a command to draw.

The HDD stores an application 1 which the CPU executes, and a drawing driver 2, as shown in FIG. 2. The application 1 is a program for a specific use such as word processor software, software for drawing figures. The application consists of commands which the CPU reads and executes. The drawing driver 2 is a program which controls the frame buffer 3. When commands such as writing letters, drawing a line, drawing a bit image are given to the drawing driver 2, an image datum corresponding to each command is written in the frame buffer 3.

The interface portion outputs the image datum stored in the frame buffer 3 to devices such as a printer and a display.

An explanation about several kinds of drawing mode used when the drawing driver 2 writes the image datum to the frame buffer 3 in accordance with the command to draw is described. As drawing modes used when a pattern of an image is assigned by the application 1 while making an image datum already written in the frame buffer 3 as a base image datum, there are four major drawing modes: a rewriting method, a drawing using a mask image (below, simply referred to as the "mask image method"), an OR method, and an XOR method. Among these drawing modes, the XOR method is most frequently used. A more specific explanation about these four drawing modes is described hereinbelow.

In the rewriting method, an assigned pattern can be drawn regardless of an image drawn on the base image datum.

Figures 7A, 7B, 7C, 7D, 8:
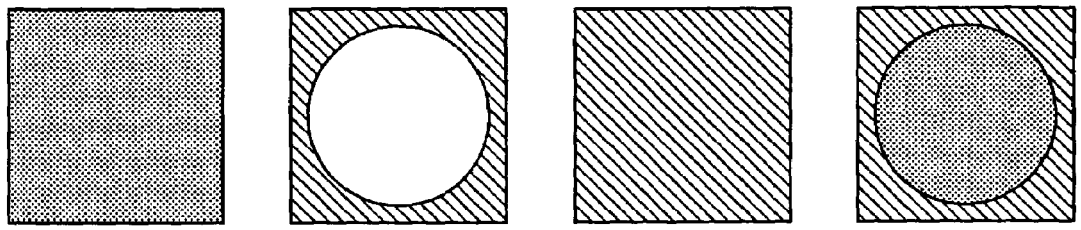
FIGS. 7A to 7D are drawings showing an example of a result of drawing using a mask image.
FIG. 8 is a chart showing operation rules in drawing using a mask image.

An explanation about the mask image method is described with reference to FIGS. 7A to 8. This mode is used when a pattern is wanted to be drawn in an assigned area of the frame buffer 3. In FIGS. 7A to 7D, areas of diagonal lines indicate areas to be blacked out.

FIG. 7A shows an assigned drawing pattern. FIG. 7B is an image for assigning a drawing area. That is, a mask image masking an area where the assigned pattern is not drawn. FIG. 7C shows a primary state of the drawing area. That is, a state of the frame buffer 3 before drawing, and it is entirely blacked out. FIG. 7D shows a drawing result. FIG. 8 shows operation rules in this drawing. Here, pattern "0" indicates an output as black, and pattern "1" indicates an output as white. According to the first, second, fifth, and sixth lines of the operation rules, the primary state of the drawing is maintained in an area of black (0) in the image for assigning a drawing area, regardless of the kind of pattern. On the other hand, according to the third, fourth, seventh, and eighth lines of the operation rules, the assigned pattern is drawn in an area of white (1) in the image for assigning a drawing area, regardless of the kind of pattern. Therefore, the assigned pattern can be drawn in an assigned area in this drawing mode, regardless of what is drawn on the base image datum.

In the aforementioned mask image method, two kinds of image data, for the pattern and for assigning a drawing area, are required for one drawing process. On the other hand, the OR method shown in FIGS. 9A to 10 requires only one image datum for one drawing process. In FIGS. 9A to 9C, areas of diagonal lines indicate areas to be blacked out.

FIG. 9A shows an assigned drawing pattern. FIG. 9B shows a primary state of the drawing area. FIG. 9C shows a drawing result. FIG. 10 shows operation rules in this drawing. Here, pattern "0" indicates an output as black, and pattern "1" indicates an output as white. According to the first and second lines of the operation rules, the primary state of the drawing is maintained in an area of black (0) in the image for assigning a drawing area, regardless of the kind of pattern. On the other hand, according to the third and fourth lines of the operation rules, the assigned drawing pattern is drawn in an area of white (1) in the image for assigning a drawing area, regardless of the kind of pattern. Therefore, the assigned pattern can be drawn in the OR method when nothing is drawn in the primary state of the drawing area, that is, the drawing area is entirely blacked out. In this case, an effectiveness of data transmission is higher than that of the aforementioned mask image method.

However, in the OR method, the assigned pattern is not drawn normally in a case described below. In the aforementioned example of the OR method, the pattern "0" of the frame buffer 3 is output as black and the pattern "1" of the frame buffer 3 is output as white. On the contrary, when the pattern "0" of the frame buffer 3 is output as white and the pattern "1" of the frame buffer 3 is output as black, a problem occurs. FIG. 11A shows an assigned drawing pattern. FIG. 11B shows a primary state of the drawing area. FIG. 11C shows a drawing result. In FIGS. 11A to 11C, areas of diagonal lines indicate areas to be blacked out. In this example, all the assigned pattern is output as black (1) when the primary state of the drawing area is black (1). This problem stems from the fact that the operation rules of the pattern "0" and the pattern "1" is asymmetrical in the OR method. It is required for solving this problem to determine which pattern is output as black and to change the operation rules into an appropriate one.

Compared with the OR method, the XOR method shown in FIGS. 12 to 13D can draw the assigned pattern properly regardless which color is used on the base image datum. Operation rules in the XOR method are shown in FIG. 12. In a case where the pattern "0" of the frame buffer 3 is output as white and the pattern "1" of the frame buffer 3 is output as black, the assigned pattern is drawn as it is when the primary state of the drawing area is black (0), according to the first and third lines of this operation rules. When the primary state of the drawing area is white (1), a reversed pattern of the assigned pattern is drawn.

On the other hand, In a case where the pattern "1" of the frame buffer 3 is output as white and the pattern "0" of the frame buffer 3 is output as black, a reversed pattern of the assigned pattern is drawn when the primary state of the drawing area is black (1), according to the second and fourth lines of this operation rules. Therefore, the assigned pattern is inverted in advance. FIG. 13A shows an assigned pattern. FIG. 13B shows a reversed pattern of the assigned pattern shown in FIG. 13A. Here, an area within a circle shown in FIG. 13B means a reversed pattern of a pattern within a circle shown in FIG. 13A. FIG. 13C shows a primary state of the drawing area. FIG. 13D is a drawing result. In FIGS. 13A to 13D, areas of diagonal lines indicate areas to be blacked out. When the primary state of the drawing area is white (0), the assigned pattern is properly drawn without inversion, according to the first and third lines of this operation rules. As a result, the XOR method is most frequently used as a drawing mode because the assigned pattern is drawn properly regardless which color is used on the base image datum.

As described in Description of Related Art, when the coordinates in the command to black out an area of $100 \leq y < 101$ (B=100, T=101) are reduced to 40% and then rounded to a whole number to output to a low-resolution drawing device, the command is converted to (B=40, T=40). As a result, a ruled line is not drawn because a width of the ruled line is lost. To prevent the aforementioned problem, a width of the ruled line is compensated by adding 1 to the value T when the value B is equal to the value T in a converted command in this embodiment. Since the command (B=40, T=41) is executed by this compensation, an area of y=40 is blacked out, then a ruled line is drawn.

There is no problem when the rewriting method is used as the drawing mode. However, the XOR method is most frequently used as the drawing mode as described. There is a possibility that drawing is not executed properly when the compensation is executed. An explanation about this problem and a countermeasure thereto is described hereinbelow.

Suppose commands to draw 1 described below are sent in a condition where the XOR method is used as the drawing mode.

commands to draw 1: (B=100, T=101), (B=101, T=102), (B=102, T=103), (B=103, T=104)

Figure 5:
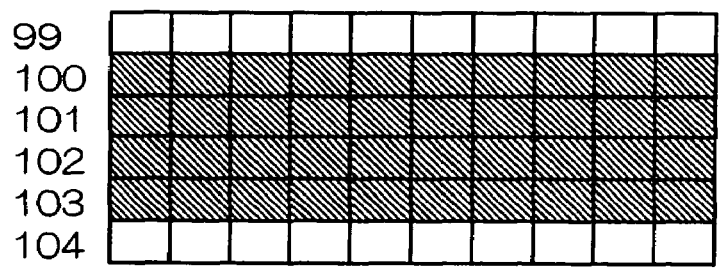
FIG. 5 is a drawing showing a result of executing four commands to draw.

When the commands to draw 1 is written in the frame buffer 3 and output from a device, a drawing result is as shown in FIG. 5. Areas of diagonal lines indicate areas to be blacked out. When the values in the commands to draw 1 are reduced to 40% and are rounded to a whole number, and the aforementioned compensation is executed, the commands to draw 1 are converted to commands to draw 2 as follows.

commands to draw 2: (B=40, T=41), (B=40, T=41), (B=41, T=42), (B=41, T=42)

Figure 4:
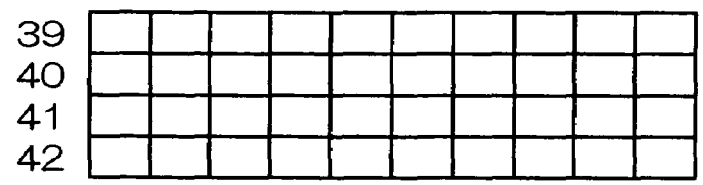
FIG. 4 is a drawing showing an irregular result of drawing when scaling down coordinates in the command to draw.

When a drawing is executed twice in the same area, inversion is also executed twice. Specifically, a line drawing by the XOR method is executed twice in an area of coordinate y=40. A line drawing by the XOR method is also executed twice in an area of coordinate y=41. As a result, the color of the base image datum is maintained, and nothing is drawn as shown in FIG. 4.

This problem may occur not only when the XOR method is used as the drawing mode, but also when any commands to draw are used as the drawing mode whereby the base image datum affects the drawing result. To prevent this problem, whether or not the base image datum affects a drawing result is determined, and whether or not the compensation is valid is controlled based on a determination result in this embodiment. When the determination is executed and the compensation is set as invalid, the aforementioned commands to draw 1 are converted as commands to draw 3 described below.

commands to draw 3: (B=40, T=40), (B=40, T=41), (B=41, T=41), (B=41, T=42)

Figure 6:
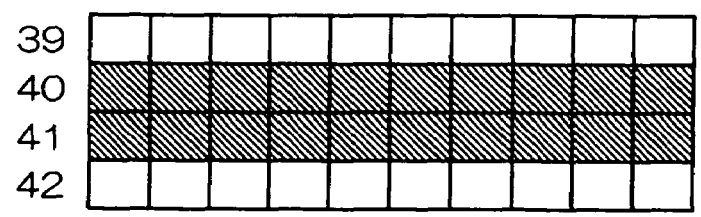
FIG. 6 is a drawing showing a normal result of drawing when scaling down coordinates in the command to draw.

Due to above process, no ruled lines are drawn by executing the first and third commands in the commands to draw 3. On the other hand, an area of coordinate y=40 is blacked out by the second command, and an area of coordinate y=41 is blacked out by the fourth command. Therefore, a drawing result becomes as shown in FIG. 6. That is, a properly scaled down drawing result can be obtained because an event in which drawing is executed twice in the same area is prevented.

A ternary raster operation and alpha blending are included in the aforementioned commands to draw in which the base image datum affects the drawing result. The ternary raster operation and alpha blending are the standard commands to draw used in a personal computer. According to these two kinds of commands to draw, the aforementioned phenomenon in which nothing is drawn (below, simply referred to as the "not-drawn phenomenon") does not always occur when executed twice on the same area. Therefore, the determination about whether the compensation is valid or invalid is executed as follows in these two kinds of commands to draw.

The ternary raster operation is a command to draw consisting of a ternary raster operation code, a pattern, a source, and a destination. The source shows an area of an original to be copied, in the frame buffer 3. The destination shows an area for copying in the frame buffer 3. There are several kinds of ternary raster operation code such as SRCERASE, which combines an inverted destination color with a source color by an AND operation, and a PATINVERT, which combines a color of an assigned pattern with a destination color, using the XOR operation. Hexadecimal numerals of 8-bit or 16-bit are assigned to these ternary raster operation codes. When a result of a determination expression 1, as described below, about a ternary raster operation code R is true, the base image datum does not affect a drawing result. Therefore, the not-drawn phenomenon does not occur even when executed twice on the same area.

a determination expression 1: ((R>>1) & 0×55)==(R & 0×55)

In the determination expression 1, a result of an AND operation of a hexadecimal numeral corresponding to the ternary raster operation code R as being shifted one bit and hexadecimal 55, is compared with a result of an AND operation of a hexadecimal numeral corresponding to the ternary raster operation code R and hexadecimal 55. When these two values are equal, the result of the determination expression 1 is true, otherwise the result is false.

However, in several kinds of ternary raster operation code such as a SRCAND, which combines a source color with a destination color by an AND operation, and a SRCPAINT, which combines a source color with a destination color by an OR operation, the not-drawn phenomenon does not occur when executed twice on the same area, despite the result of the determination expression 1 being false and the base image datum actually affecting a drawing result. Then examinations about all ternary raster operation codes (in a case where 8-bit numerals are assigned to the ternary raster operation codes, 256 codes) to determine whether or not the not-drawn phenomenon occurs when executed twice in the same area are carried out in advance, and a result of the examination is stored as a table in the drawing device of this embodiment. The drawing device of this embodiment determines whether the compensation is valid or invalid, referring to the table as needed.

The determination about whether the compensation is valid or invalid is executed as follows when the drawing mode is alpha blending. Alpha blending is a method of combining two images in a translucent state, using a coefficient called an alpha value. The alpha values are stored in alpha channels which are data areas set in each dot of an image datum. The alpha value can be set within 0 (clear and colorless) to 100 (opaque, completely covers the background color). In alpha blending, since the not-drawn phenomenon never occurs when executed twice in a same area in a case where the alpha value is 100, the compensation is determined to be valid.

An explanation of an operation flow of the aforementioned processes executed by a drawing device of this embodiment is described. FIG. 2 shows a flow of a command to draw, and an image datum in the drawing device. The CPU of the drawing device reads the drawing driver 2 and the application 1 from the HDD and stores them in the RAM. The CPU reads and executes one command at a time from an address in the RAM where the application 1 is stored. The command to draw which the application 1 generates is executed by the drawing driver 2, and an image datum is generated. In other words, the drawing driver 2 writes the image datum in the frame buffer 3 based on the command to draw.

Figure 1:
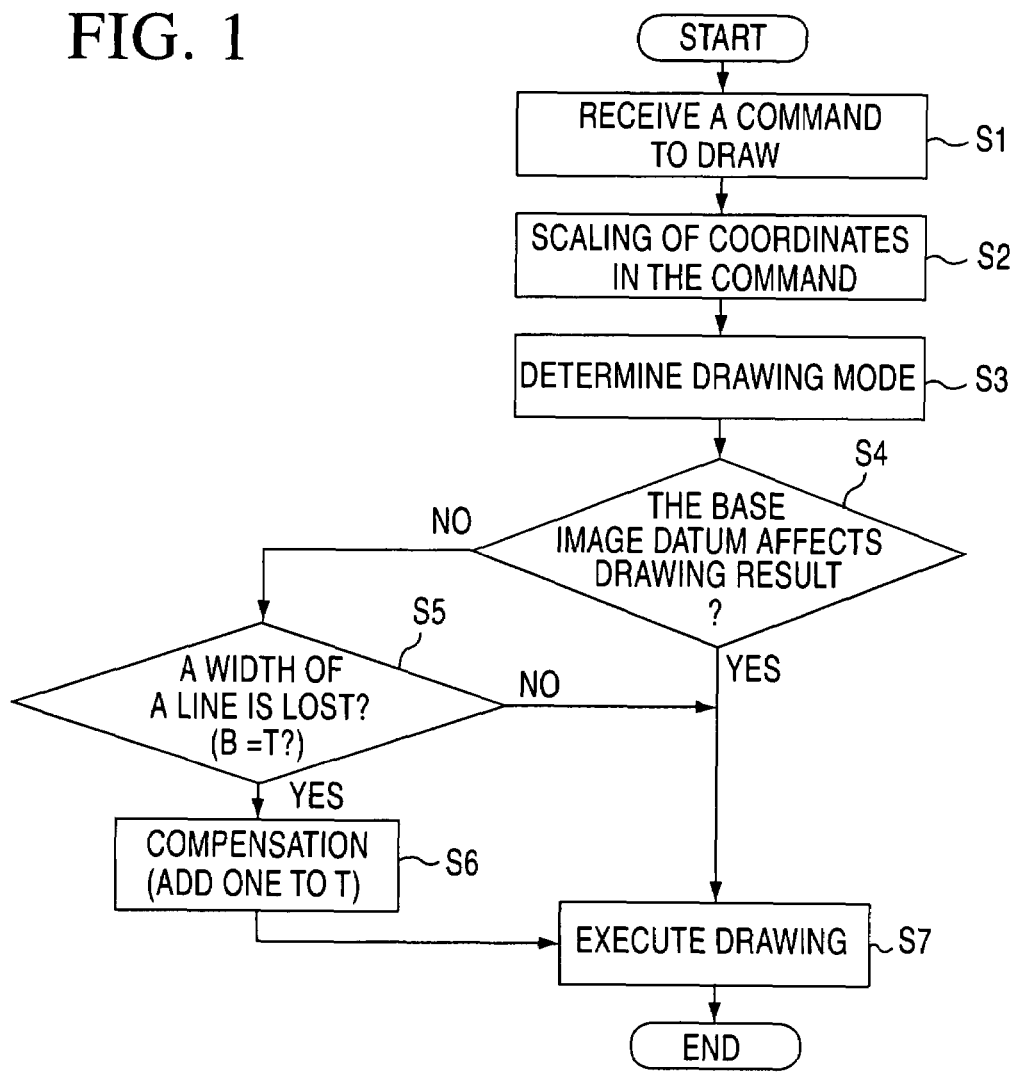
FIG. 1 is a flowchart showing a process flow of a drawing device according to an embodiment of the present invention.

Next, an explanation of an operation of the drawing device by the application 1 and the drawing driver 2 is described with referring to FIG. 1. After the application 1 generates a command to draw, the drawing driver 2 receives the command. (step S1) The drawing driver expands or scales down the coordinates in the command to draw in accordance with the scaling order assigned by the application 1. (step S2)

Then the drawing mode is determined. (step S3) In this explanation, the drawing mode is set as the XOR method. In step S4, it is determined whether or not the base image datum affects a drawing result. In this explanation, since the base image datum affects a drawing result as described, the determination result is "Yes". As for the rest of the aforementioned drawing modes, the determination result is "No" in cases of the rewriting method and the mask image method because the base image datum does not affect the drawing result. The determination result is "Yes" in a case of the OR method because the base image datum affects the drawing result.

When the determination result is "Yes", the flow proceeds to step S7, a drawing to the frame buffer 3 is executed and the process is terminated. When the determination result is "No", the flow proceeds to step S5, and it is determined whether or not the width of a ruled line is lost, that is, the value B is equal to the value T. When the determination result in step S5 is "No", the flow proceeds to step S7, a drawing to the frame buffer 3 is executed and the process is terminated. When the determination result in step S5 is "Yes", the flow proceeds to step S6, one is added to the value T, a drawing to the frame buffer 3 is executed (step S7), and the process is terminated. In the aforementioned operation, a determination about whether or not a step of adding one pixel to a width of a ruled line in the image datum when the width is lost by scaling down is executed, that is, a determination about whether this process is valid or invalid is executed based on results of step S3 and step S4. However, this determination may be executed as described below.

When a received command to draw is determined to be the ternary raster operation in step S1, it is determined about the hexadecimal numeral corresponding to the ternary raster operation whether the determination expression 1 is true or false. When the determination expression 1 is true, the determination result in step S4 is set to "No", since the base image datum does not affect a drawing result and the not-drawn phenomenon does not occur as described. When the determination expression 1 is false, the determination result in step S4 is set to "Yes".

In addition, step S3 and step S4 may be steps as follows. A result of an examination about each ternary raster operation code to determine whether or not the not-drawn phenomenon occurs when executed twice in the same area, which carried out in advance, is stored in the drawing device of this embodiment. When the received command to draw is determined to be the ternary raster operation in step S1, the result of the examination is read from the HDD and is stored in the RAM in step S3. When the ternary raster operation to be executed is determined, based on the result of the examination, not to cause the not-drawn phenomenon when executed twice, the determination result in step S4 is set to "No". When the ternary raster operation to be executed is determined to cause the not-drawn phenomenon when executed twice, the determination result in step S4 is set to "Yes".

Furthermore, an operation described below may be executed in parallel with the aforementioned operations in step S3 and step S4. When the received command to draw is determined to be alpha blending in step S1, the value of the alpha channel is read in step S3. When the value of the alpha channel is 100, the determination result in step S4 is set to "No", since the pattern of the command to draw is opaque and the base image datum does not affect a drawing result, otherwise the determination result in step S4 is set to "Yes".

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A drawing device which outputs an image datum based on a drawing mode and a command to draw, comprising:
 a coordinate conversion unit which converts coordinates in the command to draw in accordance with a designated reduction ratio;

a compensation unit which adds a width to a line to be drawn when a width of the line is lost by a conversion executed by the coordinate conversion unit; and a determination unit which makes a process to be performed by the compensation unit valid or invalid, depending on the drawing mode and the command to draw, wherein the determination unit makes the process valid or invalid depending on a determination expression when the command to draw is a ternary raster operation.

2. A drawing device which outputs an image datum based on a drawing mode and a command to draw, comprising:

a coordinate conversion unit which converts coordinates in the command to draw in accordance with a designated reduction ratio;

a compensation unit which adds a width to a line to be drawn when a width of the line is lost by a conversion executed by the coordinate conversion unit;

a determination unit which makes a process to be performed by the compensation unit valid or invalid, depending on the drawing mode and the command to draw; and a saving unit which saves a result of examination on each code of a ternary raster operation to determine whether or not an event has occurred whereby nothing is drawn when the ternary raster operation is executed twice in the same area of the image datum, wherein the determination unit makes the process valid or invalid depending on the result of examination when the command to draw is the ternary raster operation.

3. A storage medium having a computer program stored therein for outputting an image datum, the computer program comprising the steps of:

inputting a drawing mode and a command to draw;

converting coordinates in the command to draw in accordance with a designated reduction ratio;

compensating an output of the image datum by adding a width to a line to be drawn when a width of the line is lost by a conversion of the coordinates; and making the step of compensating valid or invalid, depending on the drawing mode and the command to draw, wherein, in the step of making the step of compensating valid or invalid, the step of compensating is made valid or invalid depending on a determination expression when the command to draw is a ternary raster operation.

4. A storage medium having a computer program stored therein for outputting an image datum, the computer program comprising the steps of:

inputting a drawing mode and a command to draw;

converting coordinates in the command to draw in accordance with a designated reduction ratio;

compensating an output of the image datum by adding a width to a line to be drawn when a width of the line is lost by a conversion of the coordinates; and making the step of compensating valid or invalid, depending on the drawing mode and the command to draw, wherein, in the step of making the step of compensating valid or invalid, the step of compensating is made valid or invalid in a case in which the command to draw is a ternary raster operation, depending on a result of examination on each ternary raster operation to determine whether or not an event has occurred whereby nothing is drawn when the command to draw is executed twice in the same area of the image datum.

5. A method of outputting an image datum using a computer, comprising:

a first step of inputting a drawing mode and a command to draw;

a second step of converting coordinates in the command to draw in accordance with a designated reduction ratio;

a third step of compensating an output of the image by adding a width to a line to be drawn when a width of the line is lost by a conversion of the coordinates; and a fourth step of making the third step valid or invalid, depending on the drawing mode and the command to draw, wherein the third step is made valid or invalid in the fourth step depending on a determination expression when the command to draw is a ternary raster operation.

6. A method of outputting an image datum using a computer, comprising:

a first step of inputting a drawing mode and a command to draw;

a second step of converting coordinates in the command to draw in accordance with a designated reduction ratio;

a third step of compensating an output of the image by adding a width to a line to be drawn when a width of the line is lost by a conversion of the coordinates; and a fourth step of making the third step valid or invalid, depending on the drawing mode and the command to draw, wherein the third step is made valid or invalid in the fourth step in a case in which the command to draw is a ternary raster operation, depending on a result of examination on each ternary raster operation to determine whether or not an event has occurred whereby nothing is drawn when the command to draw is executed twice in the same area of the image datum.

* * * * *